(12) United States Patent
Shipman et al.

(10) Patent No.: US 10,423,109 B2
(45) Date of Patent: Sep. 24, 2019

(54) SYSTEM AND METHOD FOR MANAGING SUBSCRIPTION AND TRADE BASED PRINTER SUPPLIES

(71) Applicant: HEWLETT-PACKARD DEVELOPMENT COMPANY, L.P., Houston, TX (US)

(72) Inventors: Amy Shipman, Portland, OR (US); Rowdy K. Webb, Portland, OR (US); Jefferson P. Ward, Brush Prairie, WA (US); Stephen D. Panshin, Corvallis, OR (US); Mark Hickman, Bend, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 11 days.

(21) Appl. No.: 14/764,884

(22) PCT Filed: Jan. 31, 2013

(86) PCT No.: PCT/US2013/024115
§ 371 (c)(1),
(2) Date: Jul. 30, 2015

(87) PCT Pub. No.: WO2014/120199
PCT Pub. Date: Aug. 7, 2014

(65) Prior Publication Data
US 2016/0011554 A1    Jan. 14, 2016

(51) Int. Cl.
*G03G 15/00* (2006.01)
*G06F 21/10* (2013.01)
(Continued)

(52) U.S. Cl.
CPC ....... *G03G 15/5016* (2013.01); *G06F 3/1219* (2013.01); *G06F 3/1239* (2013.01);
(Continued)

(58) Field of Classification Search
CPC .................................................. G06Q 20/145
(Continued)

(56) References Cited

U.S. PATENT DOCUMENTS 7,216,951 B2    5/2007    Garrana et al.
7,532,835 B2    5/2009    Lovat et al.
(Continued)

FOREIGN PATENT DOCUMENTS

CN    101097416    1/2008
CN    101166227    4/2008
(Continued)

OTHER PUBLICATIONS

International Searching Authority, International Search Report and Written Opinion, dated Oct. 29, 2013, 15 pages.
(Continued)

*Primary Examiner* — David M. Gray
*Assistant Examiner* — Andrew V Do
(74) *Attorney, Agent, or Firm* — HP Inc. Patent Department (57) ABSTRACT

Techniques pertaining to printing a document are disclosed. A printer may include a replaceable marking supply that is either an unrestricted trade supply or a restricted subscription supply. The printer may accommodate either of the unrestricted trade supply or the restricted subscription supply at any given moment.

16 Claims, 6 Drawing Sheets (51) Int. Cl.
*G06Q 10/08* (2012.01)
*G06F 3/12* (2006.01)
*G06Q 20/14* (2012.01)

(52) U.S. Cl.
CPC ............ *G06F 3/1287* (2013.01); *G06F 21/10* (2013.01); *G06Q 10/087* (2013.01); *G06Q 20/145* (2013.01)

(58) Field of Classification Search
USPC ..................................................... 399/12, 79
See application file for complete search history.

(56) References Cited

U.S. PATENT DOCUMENTS

| | | | |
|---|---|---|---|
| 8,215,548 B2 | | 7/2012 | Gnanasambandam et al. |
| 8,229,314 B2 | * | 7/2012 | Shustef .................. G03G 21/02 399/10 |
| 8,319,998 B2 | * | 11/2012 | Kaneko .................. G03G 21/02 358/1.15 |
| 8,332,332 B2 | | 12/2012 | Carlson et al. |
| 2002/0087470 A1 | * | 7/2002 | Hayes .................. G06Q 20/102 705/40 |
| 2002/0113991 A1 | | 8/2002 | Borg et al. |
| 2002/0127020 A1 | | 9/2002 | Childers |
| 2002/0131079 A1 | | 9/2002 | Forbes et al. |
| 2003/0090705 A1 | | 5/2003 | Ferlitsch |
| 2004/0062558 A1 | * | 4/2004 | Crichton ............ G03G 15/0121 399/12 |
| 2005/0060249 A1 | | 3/2005 | Silverbrook et al. |
| 2009/0207440 A1 | | 8/2009 | Kaneko et al. |
| 2011/0075189 A1 | | 3/2011 | Refstrup |
| 2011/0188070 A1 | | 8/2011 | Pala et al. |
| 2012/0254050 A1 | * | 10/2012 | Scrafford ............... G06Q 10/00 705/318 |
| 2012/0317002 A1 | * | 12/2012 | You ........................ G06Q 10/10 705/30 |

FOREIGN PATENT DOCUMENTS

| | | |
|---|---|---|
| CN | 102390736 | 3/2012 |
| EP | 0871088 | 10/1998 |

OTHER PUBLICATIONS

ObjectPrint Software, Version 4.0, User Guide, Fitosoft, 2012. pp. 1-39, Available at: <fitosoft.com/download/ObjectPrint.pdf>.

* cited by examiner

SYSTEM AND METHOD FOR MANAGING SUBSCRIPTION AND TRADE BASED PRINTER SUPPLIES

BACKGROUND

Ink and/or toner cartridges are necessary for printed to print documents. Typically, ink cartridges are replaceable and disposable upon using all of the ink or toner contained therein. Consumers must purchase new ink/toner cartridges to continue printing. Thus, one cost of printing is directly affected by the cost of buying replacement ink/toner cartridges. In a separate cost model, some printers may allow printing based on a subscription service using ink cartridges that are restricted according to the terms of the subscription service. In this model, consumers may pay for the ability to print each page.

DETAILED DESCRIPTION

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the respired method steps. The required structure for a variety of these machines will appear from the description given.

In participating in a subscription ink model, consumers would like to select a printer that best meets their needs without having to trade-off a desired feature set. Market scalability may be expanded by adopting a model that utilizes printers that can accommodate both subscription model supplies and traditional model supplies. Scalability may be expanded by cost reduction and an increased feature set of eligible printers while simultaneously allowing consumers the flexibility to choose between a traditional printer model and a subscription printer model on a print job by print job basis. The marking supplies (e.g., ink/toner) may contain data (preferably encoded electrically) that allows the printer to determine that the marking supplies are uniquely different from unrestricted trade supplies (e.g., off the shelf) in the formulation or quantity of ink contained therein.

A traditional model allows the consumer to control the marking supplies while a subscription model places control and management over print supplies in a cloud based server application. Having the cloud based control and management system in place provides flexibility, enhanced security measures, and enhanced pricing constructs. Over time, printer usage may be made more secure and cost controllable based on consumer behavior and usage patterns.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Figure 1:
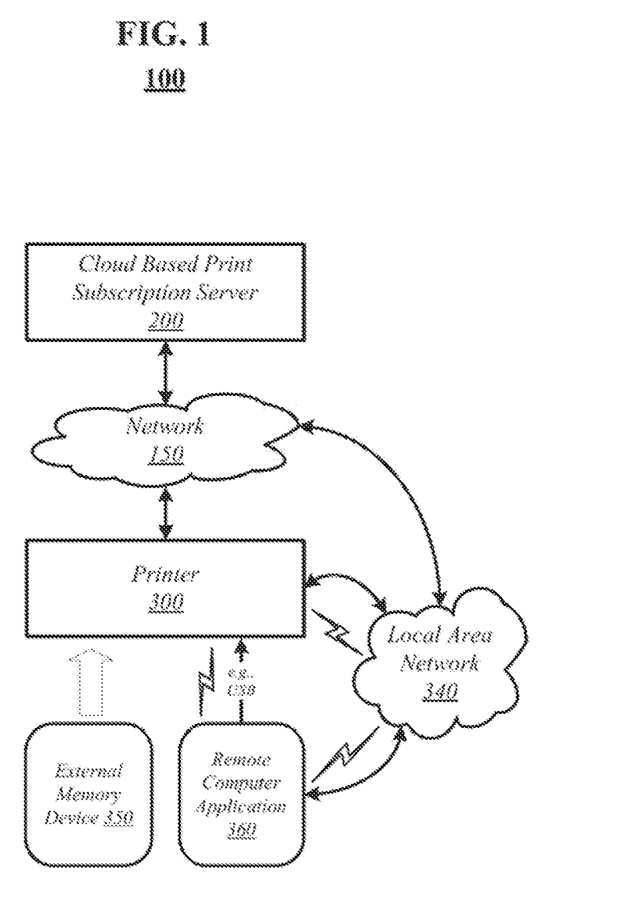
FIG. 1 illustrates an example embodiment of a system architecture for printing documents using a hybrid cloud controlled subscription service according to an embodiment of the disclosure.

FIG. 1 illustrates an example embodiment of a system architecture 100 for printing documents using a hybrid cloud controlled subscription service according to an embodiment of the disclosure. A cloud based print subscription server 200 may be coupled over a network 150 to a printer 300. The printer 300 may accommodate standard trade marking supply or subscription marking supply at any given moment. The network 150 may be, for instance, the Internet or an Intranet (e.g., a wide area network (WAN)) servicing a large organization of networked computers. Moreover, the printer 300 may be coupled with the cloud based print subscription server 200 over a network 150 via a smaller local area network (LAN) 340 operative to service one or more devices and/or computers utilizing one or more shared resources such as an access point to the network 150. The printer 300 may be coupled to LAN 340 via a wired or wireless (e.g., Bluetooth or 802.11) connection. In another embodiment, the printer 300 may be directly coupled with the network 150 via an access point such as a modem (not shown). A modem may be internal or external to the printer 300.

The printer 300 may also accept an external memory device 350 that may be coupled directly to the printer 300. Some examples of external memory devices may include, but are not limited to, USB flash drives, SD flash memory cards, or the like. The printer 300 may also be accessed by one or more other devices such as a personal computer (PC), tablet computer, portable computing device (e.g., smartphone), or other computer device executing one or more remote computer applications 360 over LAN 340 via a wired or wireless connection. The remote computer applications 360 may include software for contacting and engaging with printer 300 to create print jobs.

Figure 2:
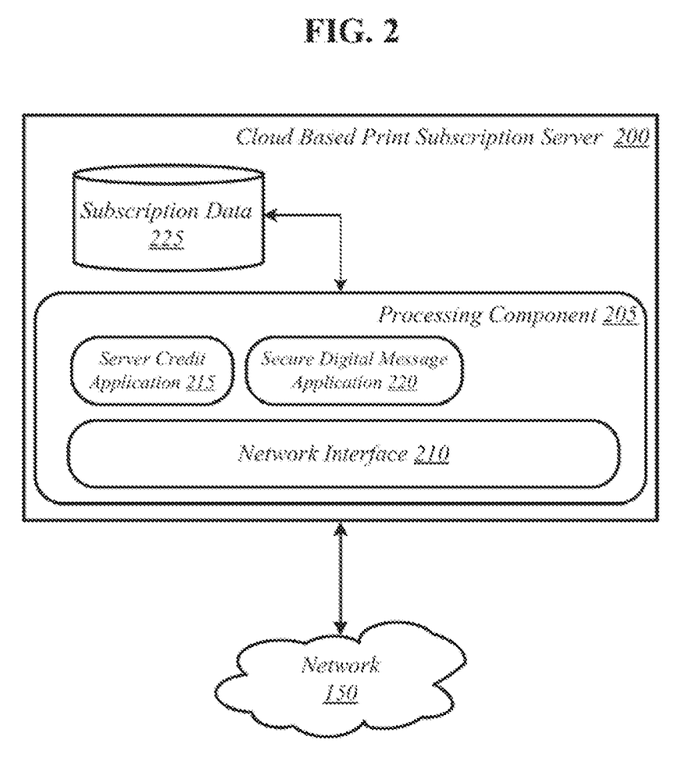
FIG. 2 illustrates an example embodiment of a cloud based subscription supply server according to an embodiment of the disclosure.

FIG. 2 illustrates an example embodiment of a cloud based print subscription server 200 according to an embodiment of the disclosure. The cloud based print subscription server 200 may include a processing component 205. The processing component 205 may control a network interface 210, a server credit application 215, and a secure digital message application 220. A subscription database 225 may include information pertaining to registered users and printers of a subscription ink service. The network interface 210 may be responsible for passing data between the network 150 (and points beyond) and applications executing on the cloud based print subscription server 200.

The server credit application 215 may be operative to enroll new users/printers, manage payment for the subscription ink service, and replenish/track credit available under a subscription that is associated with a particular printer. Information provided by users may be stored securely in the subscription database 225. This information may include personal user identification information, financial information (e.g., credit card or bank account information), and printer hardware information. The server credit application 215 may provide a web-site based interface allowing a user to interact with the server credit application 215 over a web browser type interface. Alternatively, a specific downloadable interface application may be installed and run on a client computer machine such as, for example, a personal computer (PC), mobile computing device, smartphone, tablet computing device, or printer. The server credit application 215 may be configured such that it may not be accessed until the user has successfully executed a security protocol such as, for instance, entering a user ID and password. The server credit application 215 may also serve as the point of contact for enrolling in the subscription ink service. Enrollment may include providing the personal, financial, and printer hardware information necessary for the subscription ink service to perform its duties as well as setting up an account such as the aforementioned user ID and password. Once enrolled, a user may execute a subscription agreement via the server credit application 215 that sets out the parameters of use of subscription marking supply on a particular printer.

For example, the subscription agreement may specify the cost to print a page using the subscription marking supply. The cost may be calculated based on the parameters of a print job. For instance, the base cost of a black & white printed page (e.g., impression) using the normal quality mode of a printer may be set at 3 cents. This figure may be determined based on the model of the printer that will use the subscription marking supply. If the user specifies a print job be printed in draft mode, a lesser quality print that uses less ink/toner, the cost per page/impression may be reduced to 2 cents. On the other hand, if the user specifies the print job be printed in best mode, a higher quality print that may use more ink/toner than normal, the cost per page/impression may be increased to 4 cents. A similar determination may be made for color prints if the printer is capable of printing in color.

Once the fees are set is the subscription agreement, the user may fund the server credit application 215 with funds from a credit card, bank account, or the like. Subscriptions may be offered by an integrator like a telecommunications service provider and included in monthly billing. Subscriptions may also be based on a flat monthly fee such as unlimited printing for $XX/month, or limited printing YY pages/month at a flat fee+overage charges. This may be similar to a tiered data plan for a cell phone service.

The amount of funds may then be converted to data indicative of a number of pages/impressions that may be printed by the printer and stored in a secure digital file. The data may be calculated based on the type of print job requested by the printer. For instance, the initial credit may allow for 1000 normal mode black & white pages, 1500 draft mode black & white pages, or 750 best mode black & white pages based on the per page cost determined in the subscription agreement. This data may then be digitally encoded by the secure digital message application 220 and sent as a secure digital file over the network to the printer 300. The printer 300 may now locally manage its print services using the subscription marking supply based on the data in the secure digital file. The server credit application 215 may periodically poll the printer 300 to determine the remaining page count and may issue additional credit via another secure digital file provided the user has replenished the funds for his or her account with the subscription ink service.

Figure 3:
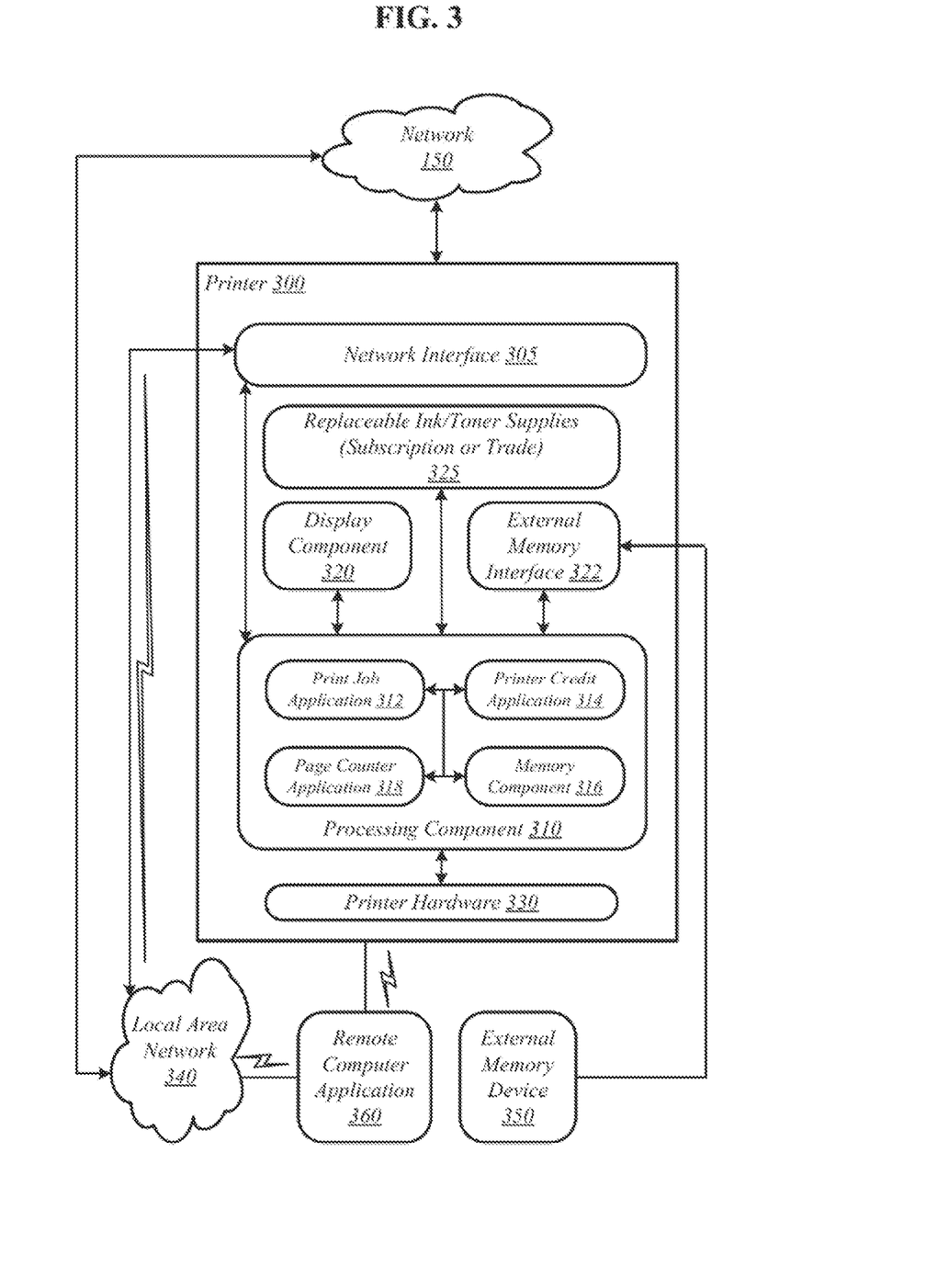
FIG. 3 illustrates an example embodiment of a hybrid printer architecture according to an embodiment of the disclosure.

FIG. 3 illustrates an example embodiment of an architecture for a printer 300 according to an embodiment of the disclosure. The printer 300 may include a network interface 305, processing component 310, a display component 320, an external memory interface 322, replaceable marking supply 325 (either trade or subscription supplies), and other printer hardware 330 necessary to execute a print job. The network interface 305 may be responsible for passing data between the network 150 and the cloud based print subscription server 200. The processing component 310 may control the network interface 305, a print job application 312, a printer credit application 314, a memory component 316, a tamper resistant page counter application 318, the display component 320, the external memory interface 322, and the printer hardware 330.

The printer 300 may initially ship with replaceable marking supply 325 that are of the trade variety. In this configuration, the user may print simply based on the amount of ink/toner remaining in the supply reservoir. There are no restrictions placed on print jobs. When the unrestricted trade supplies run out, the user may simply purchase new unrestricted trade supplies and replace the spent unrestricted trade supplies.

The printer 300 may also be capable of accepting replaceable marking supply 325 of the subscription variety provided the printer is operatively coupled with the network 150 such that the cloud based print subscription server 200 may communicate with the printer 300. In this scenario, the cloud based print subscription server 200 may send a secure digital file from the secure digital message application 220 to the printer 300. The secure digital file allows the printer 300 to accept and use replaceable marking supply 325 of the subscription variety. The subscription supplies may be delivered to the user or picked up from a designated location. There is typically no charge to obtain the subscription supplies as the cost is based on the subscription service agreement. The use of the subscription supplies may be based on the credit data in the secure digital file. Without the file, the subscription supplies will be rejected by the printer 300.

The print job application 312 may be operative to receive print job requests from a remote computer application 360 or an external memory device 350 via the external memory interface 322. Print job requests received from remote computer application(s) 360 may be received either wired or wirelessly directly from a remote computer application 360 or via a local area network (LAN) 340. The print job application 312 may cause a dialog box to open on the client computer machine when a print job request is received. The dialog box may include options for the user to select whether the print job is to be performed in normal, draft, or best mode. The default selection may be the normal mode.

For print job requests that do not come from a remote computer application 360 (e.g., from an external memory device 350), the printer's display component 320 in conjunction with the print job application 312 may guide the user through the mode selection process. The default mode may be set to normal for convenience.

As described above, the secure digital file contains data indicative of a number of pages/impressions that may be printed using the subscription supplies. Based on the mode selection for a given print job submitted to the pint job application 312, a credit calculation may be performed by the printer credit application 314 to determine if there is sufficient credit available to print the requested job. The print job application 312 may forward the specifics of the print job to the printer credit application 314. The specifics may include the number of pages to be printed and the mode in which to print them. Using this information, the printer credit application 314, which has access to the secure digital file in the memory component 316, may cheek to sec if the requested number of pages for the mode identified exceeds the remaining number of pages for the mode identified. If so, the print job request is denied. If the print job is denied due to insufficient funds, the user may swap out the subscription marking supply with trade marking supply and execute the print job request. This hybrid feature permits a user to have back-up print capabilities if the subscription supplies are inaccessible due to not enough credit remaining for a requested print job.

Otherwise, the print job request is allowed and may be executed by the printer hardware 330. Upon execution of a print job, a tamper resistant page counter application 318 increments and stores the number of pages printed, optionally, and the mode in which they were printed. The tamper resistant page counter application 318 may then update a tamper resistant page counter and a credit file in the storage component within the printer to reflect the fact that a certain number of pages were printed.

For example, prior to the print job request, the secure digital file may have specified that there was enough credit (e.g., $15) to print 500 normal mode pages, 750 draft mode pages, and 375 best mode pages. The print job may have printed 100 pages in normal mode. Using the tamper resistant page counter application 318 data and the secure digital file, the credit available may be re-calculated as 400 normal mode pages, 600 draft mode pages, and 300 best mode pages to reflect a value of $12. The new credit data may then be written into a credit file stored in memory component 316 within the printer 300 to be used for the next print job request. The above figures have been calculated using an arbitrary value of 3 cents per page in normal mode, 2 cents per page in draft mode, and 4 cents per page in best mode. The values used are merely illustrations for the sake of providing art example and are not to be considered limiting of the embodiments described herein.

Periodically, the server credit application 215 may poll the printer 300 over the network connection 150 to determine the remaining credit amount. If the credit amount is below a threshold value, the credit server may automatically initiate a credit replenishment process according to the terms of the subscription agreement. For example, the user may have authorized a replenishment of $50 whenever the credit value on the printer dips below $5. The server credit application may charge the credit card on file or debit the bank account provided to obtain the funds for the credit replenishment.

Credit replenishment may also occur manually at the initiation of the user via a web page interface. For example, the user may have an unusually large print job that needs to be executed but does not have enough credit to cover the print job. The credit remaining, however, may be above the automatic replenishment threshold. The user may log-in and authorize a funds transfer or credit charge on a one-time or recurring basis to immediately add credit to the printer 300. The server credit application 215 may then issue a new or updated secure digital file with the new credit amount to the printer 300 over the network 150. The new secure digital file may then replace or otherwise update the existing secure digital file in memory component 316 within printer 300.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be reunited for a novel implementation.

Figure 4:
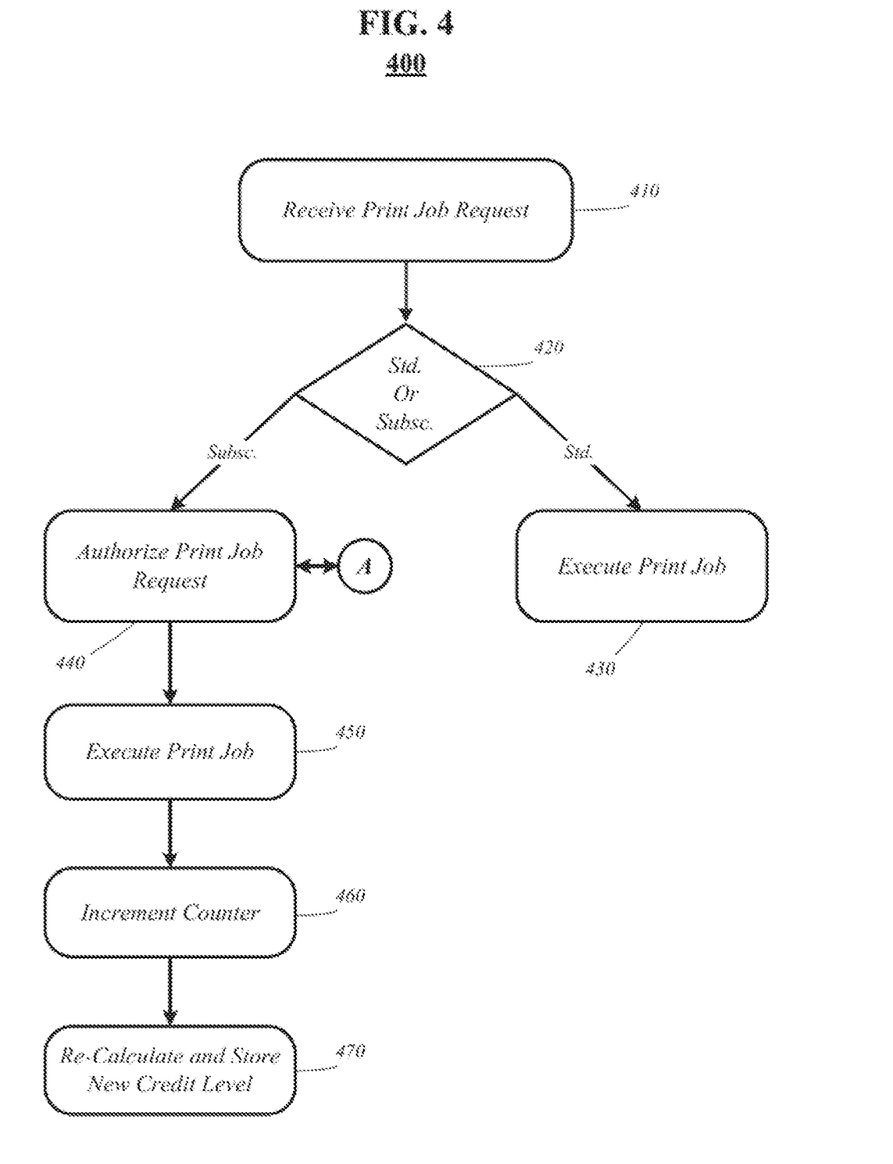
FIG. 4 illustrates an example embodiment of a logic flow.

FIG. 4 illustrates an embodiment of a logic flow. The logic flow 400 may be representative of some or all of the operations executed by one or more embodiments described herein. The embodiments are not necessarily limited to the examples described herein. In the illustrated embodiment shown in FIG. 4, the logic flow 400 may receive and process print job requests from subscription ink service eligible printers. The processing may include verifying printer account status before authorizing use of on-board subscription printer supplies such as ink/toner.

In the illustrated embodiment shown in FIG. 4, the logic flow 400 may receive a print job request at block 410. For example, a remote computer application 360 may initiate a print job request for a particular document. The print job request may open a dialog box to assist in executing the print job. The dialog box may present the user with options for selecting a particular printer 300. One or more of the available printers may be linked with a subscription print service and equipped with on-board replaceable marking supply 325 that may only be accessed if a secure digital file received from a cloud based print subscription server 200 is present. The riser may also be prompted to select the mode (e.g., normal, draft, best) in which a given print job will be executed. The dialog box may be configured to display a default printer 300 selection and a default mode selection. In this way, the user need only change the settings if a different printer or a different mode of printing is desired.

In the illustrated embodiment shown in FIG. 4, the logic flow 400 may determine what type of replaceable marking supply 325 the printer 300 is housing at block 420. For example, the print job application 312 may determine whether the replaceable marking supply 325 currently housed in the printer 300 are of the trade variety or the subscription variety.

In the illustrated embodiment shown in FIG. 4, the logic flow 400 may execute a print job request at block 430. For example, when the determination made in block 420 is that trade marking supply are currently housed in the printer 300, the print job may be processed without regard to any subscription service. The print job application 312 under control of processing component 310 may cause printer hardware 330 to execute the requested print job using the replaceable trade marking supply 325. There are no restrictions placed on the usage of unrestricted trade supplies. Prior to execution, however, the print job application may optionally issue a notification to the user that the print job will be executed using the unrestricted trade supplies. Alternatively, the dialog box may include an icon next to the name/location of the printer 300 to indicate whether that printer 300 is currently housing an unrestricted trade or a restricted subscription marking supply 325. Thus, the user may be given the opportunity to switch between unrestricted trade or restricted subscription supplies for a given print job.

In the illustrated embodiment shown in FIG. 4, the logic flow 400 may authorize a print job request at block 440. For example, when the determination made in block 420 is that subscription marking supply are currently housed in the printer 300, the print job may be processed accordingly. The authorization process may be represented by block A and is more fully described with reference to FIG. 5.

Assuming tire authorization process is successfully completed, the logic flow 400 may execute the print job at block 450. For example, the print job application 312 under control of processing component 310 may cause printer hardware 330 to execute the requested print job using the replaceable subscription marking supply 325.

In the illustrated embodiment shown in FIG. 4, the logic flow 400 may increment a counter at block 460. For example, upon successful completion of the print job, a tamper resistant page counter application 318 may increment and store the number of pages printed and the mode in which they were printed. The tamper resistant page counter application 318 keeps track of the number and mode of printed pages to prevent the user from exceeding its allowed allotment of pages based on the credits remaining.

In the illustrated embodiment shown in FIG. 4, the logic flow 400 may re-calculate and store a new credit level at block 460. The tamper resistant page counter application 318 may update to reflect the fact that a certain number of pages were printed. For example, prior to the print job request, the secure digital file may have specified that there was enough credit (e.g., $15) to print 500 normal mode pages, 750 draft mode pages, and 375 best mode pages. The print job may have printed 100 pages in normal mode. Using the tamper resistant page counter application 318 data, the credit available may be recalculated as 400 normal mode pages, 600 draft mode pages, and 300 best mode pages to reflect a value of $12. The new credit data may be written into a credit file in the memory component 316 within the printer 300 to be used for the next print job request. The above figures have been calculated using an arbitrary value of 3 cents per page in normal mode, 2 cents per page in draft mode, and 4 cents per page in best mode.

In another embodiment, the credits available may be determined as follows:

Credits Available=Maximum Credits Enabled (from the Secure Digital File)–Total Credits Consumed (from the Tamper Resistant Counter)

Credits available may be determined dynamically, prior to releasing each page to be printed. In one embodiment, total credits consumed may be updated after the completion of each printed page to determine if each page in a print job can be printed. In this manner, each printed page/impression may be approved and stopped mid-job if the credits are depleted.

Figure 5:
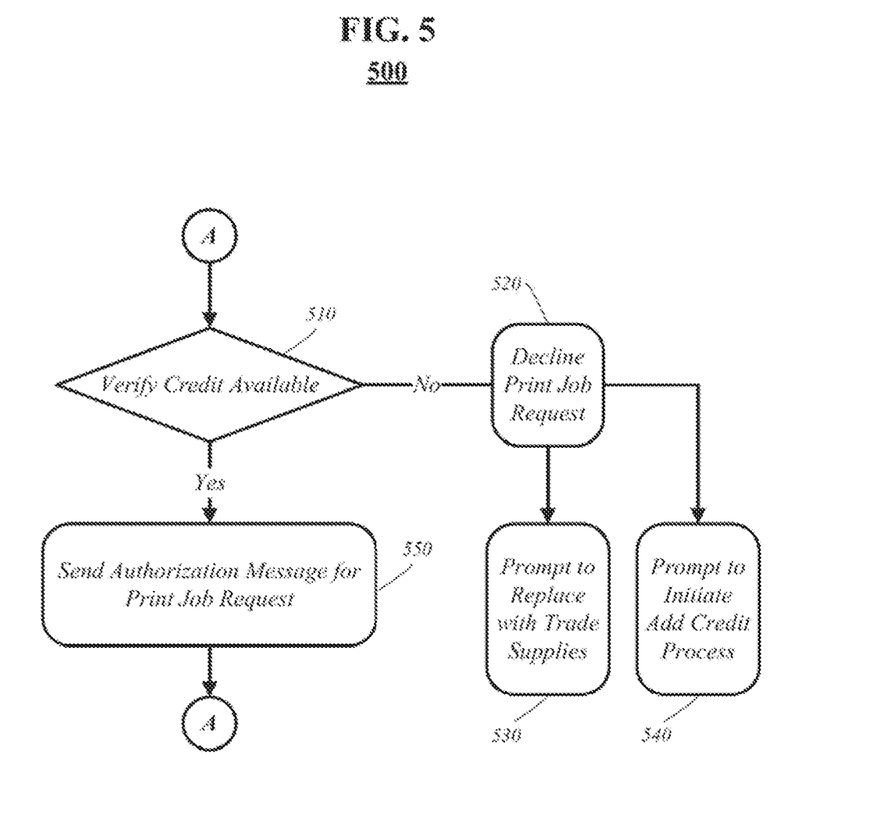
FIG. 5 illustrates an example embodiment of a logic flow.

FIG. 5 illustrates an embodiment of a logic flow. The logic flow 500 may be representative of some or all of the operations executed by one or more embodiments described herein. The embodiments are not necessarily limited to the examples described herein. In the illustrated embodiment shown in FIG. 5, the logic flow 500 may receive and authorize a print job request for an eligible subscription enabled printer 300. The subscription print job request may include data pertaining to the print job itself as well as data pertaining to the printer to be used to execute the print job. The print job data may then be verified before authorizing the print job request.

In the illustrated embodiment shown in FIG. 5, the logic flow 500 may verify whether credit is available at block 510. For example, the printer credit application may receive the print job data and determine the number of pages and mode in which the print job is to be printed. The printer credit application 314 may then access the secure digital file and the credit file from the memory component 316. The secure digital file and credit file contain the current up to date credit information for the printer 300. Using this information, the printer credit application 314 may determine whether the credit needed for the requested number of pages for the mode identified exceeds the credit for a remaining number of pages for the mode identified.

In the illustrated embodiment shown in FIG. 5, the logic flow 500 may decline the print job request at block 520. For example, if the credit calculated in block 510 is insufficient to cover what is needed to execute the print job request, the print job request is denied.

In the illustrated embodiment shown in FIG. 5, the logic flow 500 may prompt the user to replace with unrestricted trade supplies at block 530. For example, if the print job is denied in block 520 due to insufficient funds, the user may be prompted to swap out the subscription marking supply with an unrestricted trade marking supply. If the user opts to do this, the print job may be re-submitted for printing using the unrestricted trade marking supply. This hybrid feature permits a user to have back-up print capabilities if the subscription supplies are inaccessible due to not enough credit remaining for a requested print job.

In the illustrated embodiment shown in FIG. 5, the logic flow 500 may prompt the user to add credit at block 540. For example, if the print job is denied in block 520 due to insufficient funds, the user may be prompted to initiate an add credit process. Such a credit replenishment may occur manually at the initiation of the user via a web page interface. The user may log-in and authorize a funds transfer or credit charge on a one-time or recurring basis to immediately add credit to the printer 300. The server credit application 215 may then issue a new or updated secure digital file with the new credit amount to the printer 300 over the network 150. The new secure digital file may then replace or otherwise update the existing secure digital file in memory component 316 within printer 300. Once sufficient credit has been added to the account, the denied print job request may be re-submitted to use the subscription marking supply.

In the illustrated embodiment shown in FIG. 5, the logic flow 500 may send an authorization message for the print job request at block 550. For example, the print job application 312, after confirming with the printer credit application 314 that sufficient credit is remaining, may authorize the execution of the requested print job using subscription marking supply 325. The print job application 312 may then allow the printer hardware 330 to execute the print job as described above in FIG. 4.

Figure 6:
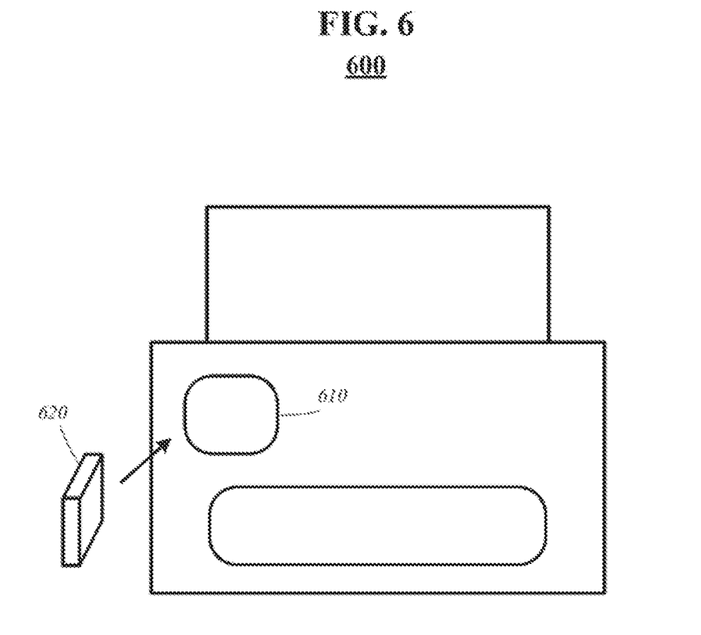
FIG. 6 illustrates an example embodiment of a hybrid printer according to an embodiment of the disclosure.

FIG. 6 illustrates an example embodiment of a hybrid printer 600 according to an embodiment of the disclosure. The hybrid printer 600 may include a marking supply interface 610 operative to receive a replaceable marking supply 620. The replaceable marking supply 620 may be one of an unrestricted trade supply or restricted subscription supply. The hybrid printer 600 may accommodate either of the unrestricted trade supply or the restricted subscription supply at any given moment.

In one embodiment, a printer may include a tamper proof page counter that keeps a running total of the number of impressions (pages) printed. Printer credit may be linked with pages printed such that the total remaining credits or pages that can be printed may be updated at the completion of each page printed. In this embodiment, the cloud based print subscription server 200, sends a secure digital file containing the credit for the printer that is unique for each printer. The secure digital file may contain the maximum number of supply subscription impressions (maximum credits) that printer is licensed to produce. The secure digital rile may be updated periodically based on the status of the subscription the customer maintains with the cloud based print subscription server 200.

Prior to printing a page, the print job application 312 calculates if maximum credits minus the credits to be consumed is greater than zero. If this is true, the print job application 312 allows the page to print. If not, printing is denied with the subscription marking supply. Prior to this condition occurring, the primer 300 may be alerted to the impending condition over network 150 and advised to either update their subscription based account status or be prepared to switch to the unrestricted trade marking supply.

In another embodiment, the credits may be based on the amount of marking supply consumed in a print job request rather than the pages in a print job request. If the units of measurement were volume of marking supply, the print job application 312 calculation would also estimate the volume of marking supply that will be consumed printing the requested page and the print job request may be permitted or denied based on whether there is sufficient marking supply remaining according to the subscription.

In still another embodiment, the units of measurement for the credit may be time based. The secure digital file may contain data specifying the maximum time the printer 300 is licensed to operate with the subscription marking supply. The tamper proof counter may also store a record of elapsed time which it would collect from a real-time clock embedded within the printer's processing component 310 or from a time stamp embedded within the secure digital file and updated with an elapsed time from a clock embedded within the printer 300.

A printer 300 may be pre-loaded with a secure digital file containing an initial amount of credits. In this scenario, a customer may purchase a printer that would accept and print with a subscription marking supply immediately after insertion. The number of impressions (pages) for which the printer is licensed may be varied to meet customer demand and as a promotional tool to encourage subscription to the cloud based marking supply service.

It is also possible to pre-authorize a particular subscription marking supply. The subscription marking supply may include a unique ID for which the credits in a secure digital file apply. The secure digital file may already contain a unique ID for the printer 300 and may also include a unique ID for the subscription marking supply. In this embodiment, a new set of credentials may be required each time a subscription marking supply is replaced.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A printing system comprising:
a marking supply interface operative to receive a replaceable marking supply, the replaceable marking supply being one of an unrestricted trade supply and a restricted subscription supply wherein the printing system may accommodate either of the unrestricted trade supply or the restricted subscription supply, wherein the unrestricted trade supply is usable to print a print job request when printing via the restricted subscription supply is to be denied and when the restricted subscription supply is replaced in the marking supply interface by the unrestricted trade supply and wherein printing via the restricted subscription supply is restricted upon determining that a sufficient credit is not available for printing a given page of the print job request wherein determining that the sufficient credit is not available for printing the given page of the print job results from verifying, for each of a plurality of pages of the print job, whether sufficient credit is available for each of the plurality of pages of the print job to use the restricted subscription supply.

2. The printing system of claim 1, further comprising:
a processing component;
a print job application operative on the processing component to receive the print job request from a computer application external to the printing system and process the print job request and determine whether the replaceable marking supply is an unrestricted trade supply or a restricted subscription supply;
a printer credit application operative on the processing component to enable the replaceable marking supply when the replaceable marking supply is a restricted subscription supply.

3. The printing system of claim 2, the printer credit application further operative to:
calculate a credit needed for the print job request based on one or more of a number of pages to be printed and an amount of marking supply required to complete the print job request; and
deny the print job request when there is insufficient credit available for the print job request.

4. The printing system of claim 3, the printer credit application further operative to:
receive at least one of the number of pages printed and the amount of marking supply used in executing the print job;
update a total credit consumed in the tamper resistant page counter application;
re-calculate a remaining credit available; and
update a credit file in the storage component with the re-calculated credit value.

5. The printing system of claim 1, further comprising:
a memory component operative to store an encoded secure digital file indicative of a number of pages that may be printed using the restricted subscription supply; and
a tamper resistant page counter application to track the number of pages printed using the restricted subscription supply.

6. The system of claim 1,
wherein the restricted subscription supply includes marking substance usable to print a print job request up to limits on usage of the marking substance established by a subscription agreement associated with the restricted subscription supply, and wherein the unrestricted trade supply includes marking substance usable to print a print job request without any limits on usage of the marking substance.

7. The system of claim 1, wherein the unrestricted trade supply is usable to print the print job request by removing the restricted subscription supply from the marking supply interface and installing the unrestricted trade supply in the marking supply interface.

8. A computer-implemented method, comprising:

receiving a print job request in a printer, the printer including a replaceable marking supply;

verifying sufficient credit is available for the print job request when the replaceable marking supply is a restricted subscription supply, wherein the verifying comprises verifying that sufficient credit is available for printing a given page of the print job request;

executing the print job request upon verification that sufficient credit is available for the print job request wherein the executing comprises executing the print job request for the given page of the print job request after the verifying, and the verifying is repeated for a next page of the print job request; and prompting a user to replace the restricted subscription supply with an unrestricted trade supply when the print job request is denied due to insufficient available credit for printing the print job request using the restricted subscription supply, wherein the unrestricted trade supply is usable to print the print job request.

9. The computer-implemented method of claim 8, further comprising:

calculating credit needed for the print job request based on one or more of a number of pages to be printed and an amount of marking supply required to complete the print job request.

10. The computer-implemented method of claim 8, further comprising:

re-calculating the credit available to the printer after execution of the print job request.

11. The computer-implemented method of claim 8, comprising:

after the prompting, determining whether the restricted subscription supply in the printer has been replaced with the unrestricted trade supply to print the print job request via the unrestricted trade supply.

12. The computer-implemented method of claim 8, comprising:

polling the printer from an external system to determine available credit; and if the available credit is below a threshold, the external system automatically replenishing the available credit of the printer according to a subscription agreement associated with the restricted subscription supply.

13. The computer-implemented method of claim 12, wherein the available credit is determined using a secure digital file in the printer, and wherein the automatically replenishing includes providing a replacement secure digital file to the printer.

14. A tangible computer-readable storage medium comprising instructions that, when executed, cause a printer to:

receive a print job request in the printer, the printer including replaceable marking supply;

verify sufficient credit is available for the print job request when the replaceable marking supply is a restricted subscription supply, wherein the instructions to verify comprise instructions to verify that sufficient credit is available for printing a given page of the print job request;

execute the print job request upon verification that sufficient credit is available for the print job request wherein the instructions to execute comprises instructions to execute the print job request for the given page of the print job request after the verifying, and the verifying is repeated for a next page of the print job request; and prompt a user to replace the restricted subscription supply with an unrestricted trade supply when the print job request is denied due to insufficient available credit for printing the print job request using the restricted subscription supply, wherein the unrestricted trade supply is usable to print the print job request with the printer when printing via the restricted subscription supply is denied.

15. The tangible computer-readable storage medium of claim 14, comprising instructions that when executed cause the system to:

calculate credit needed for the print job request based on one or more of a number of pages to be printed and an amount of marking supply required to complete the print job request.

16. The tangible computer-readable storage medium of claim 14, comprising instructions that when executed cause the system to:

re-calculate the credit available to the printer after execution of the print job request.

* * * * *